July 20, 1926.
A. EHLERS
SHOCK ABSORBER
Filed Feb. 2, 1925
1,592,928
2 Sheets-Sheet 1
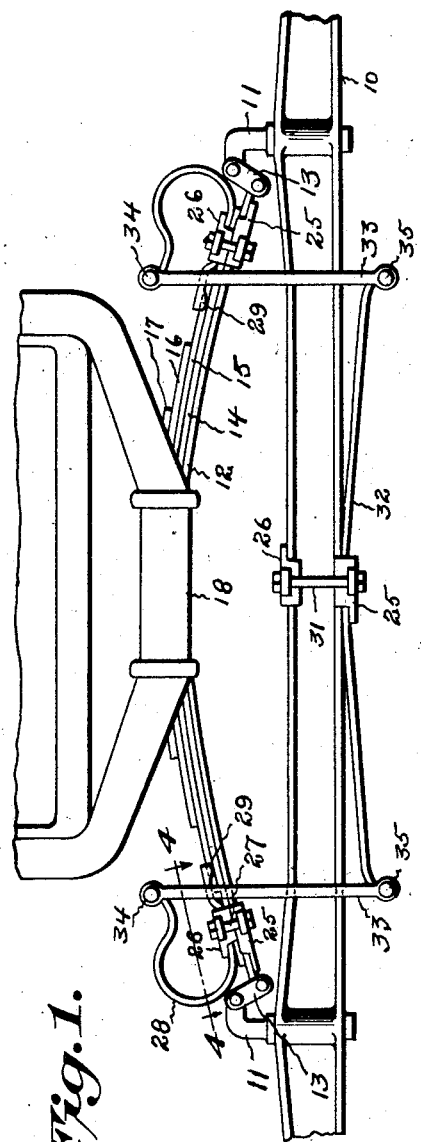
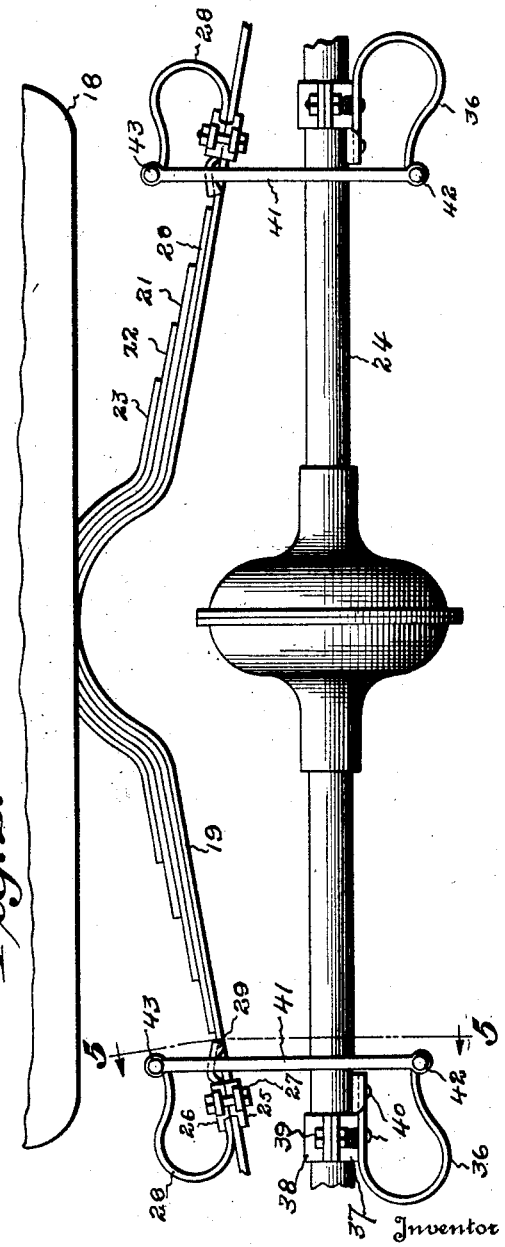
Inventor
Albert Ehlers, July 20, 1926.
A. EHLERS
SHOCK ABSORBER
Filed Feb. 2, 1925     2 Sheets-Sheet 2
1,592,928
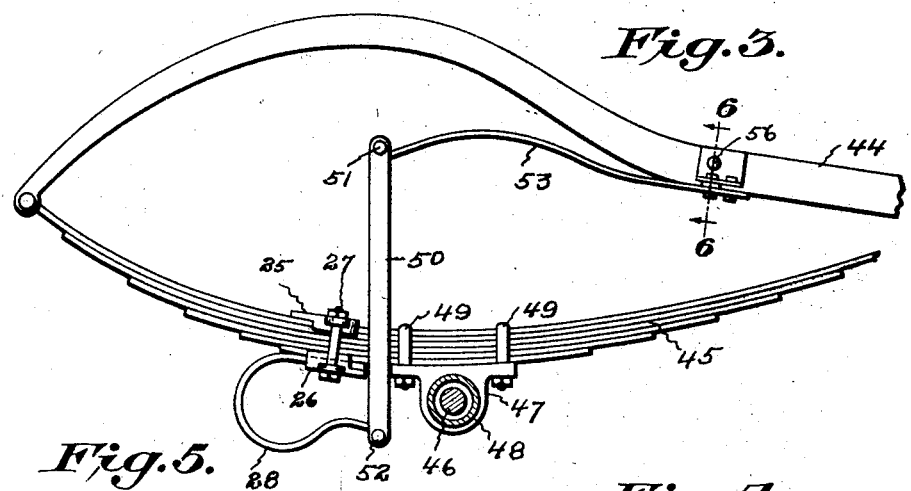
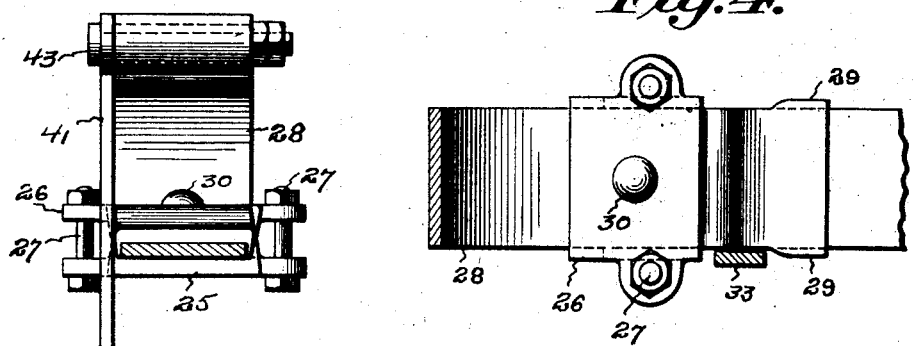
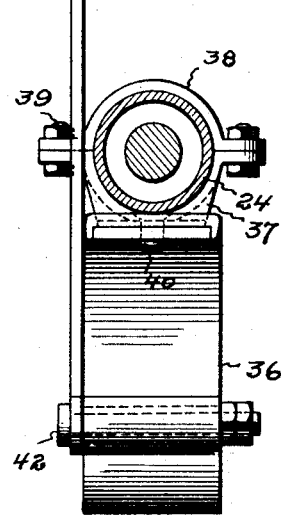
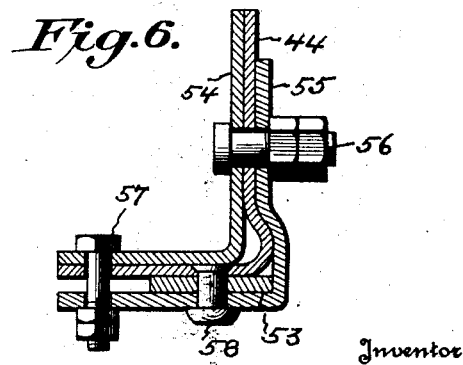
Inventor
Albert Ehlers,
By George E. Hoey
Attorney Patented July 20, 1926.

1,592,923

UNITED STATES PATENT OFFICE.

ALBERT EHLERS, OF STAMFORD, CONNECTICUT, ASSIGNOR OF ONE-THIRD TO DAVID McCORMACK, OF STRATFORD, CONNECTICUT, AND ONE-THIRD TO JAMES V. BOOTH, OF NEW YORK, N. Y.

SHOCK ABSORBER.

Application filed February 2, 1925. Serial No. 6,310.

This invention relates to a new and improved shock absorber and it is the principal object thereof to provide a device of this character that may be readily attached and detached from standard makes of motor vehicles without modification or change in the construction thereof and that will absorb the otherwise excess motion of the car due to the roughness or unevenness of the road, so that the motor vehicle may ride easier, much more smoothly and with less strain upon its operating parts.

To these and other ends, my invention consists in the shock absorber, having certain details of construction and combinations of parts, as will be hereinafter described and more particularly pointed out in the claims.

Referring to the drawings, in which like numerals of reference designate like parts in the several figures;

Figure 1 is a fragmentary front elevation of a motor vehicle of a well known type;

Figure 2 is a fragmentary rear elevation thereof;

Figure 3 is a side elevation of a portion of another style of motor vehicle with my shock absorber attached thereto;

Figure 4 is a fragmentary plan view of some of the parts, taken generally upon line 4—4 of Figure 1;

Figure 5 is an enlarged sectional elevation of some of the parts, taken generally upon line 5—5 of Figure 2; and Figure 6 is an enlarged sectional elevation of some of the parts, as illustrated in Figure 3, taken generally upon line 6—6 of Figure 3.

That portion of the front of the body of the motor vehicle shown in Figure 1 illustrates in part the front axle 10, having the spring studs 11 connected therewith that are joined with the lower leaf 12 of the leaf spring by the links 13. The leaf spring is assembled with the body 18, and is of the usual form having the parallel leaves 14, 15, 16 and 17.

In Figure 2, the spring, similarly constructed, is composed of the leaves 19, 20, 21, 22 and 23. Adjacent to this latter spring is the housing 24, within which is the rear axle (not shown).

The parts above described and referred to constitute no part of my invention, but are old and well known in the art.

My improved device consists essentially of the clamp sections 25 and 26 that are secured together by the bolts 27, or the like, and are placed opposite each other and upon opposite sides of one or more of the spring leaves. Between these clamps and secured thereby is the lop spring 28 preferably rectangular in cross section and curved substantially as shown in Figures 1 and 2, the inner ends of which have ears 29, which project over one or more of the series of leaves and hold the spring against any tendency to shift its position relatively to the clamp. If desired, the spring 28 may be secured to one of the clamp sections by a rivet 30, or the like.

Secured to the underside of the axle 10, by the clamp sections 25 and 26, that are joined by the bolt 31, is a spring 32, the outer free ends of which are connected with the free ends of the springs 28 by the links 33 and the studs 34 and 35.

In the structure illustrated in Figure 2 the mechanism is connected with the leaf spring at the rear of the motor vehicle in substantially the same manner as is shown in Figure 1, but there is substituted for the spring 32 another loop spring 36, which is secured to the lower portion 37 of a clamp, which encircles the housing 24, the upper portion of which is designated 38 and both being connected by the bolts 39, or the like. The spring 36 is preferably secured to the lower clamp portion 37 by the rivets 40, or the like. The outer free ends of these springs 28 and 36 are connected by the links 41 by means of the studs 42 and 43. Obviously, these shock absorbers just described may be readily attached or detached to any form of motor vehicle to which it is adapted.

As the body of the car moves toward the axle by reason of any unevenness or irregularity in the road, the extent of this movement is resisted by the springs 28 and 32 at the front end of the motor vehicle, and by the springs 28 and 36 at the rear end, which thereby absorb the shock of such action. This mechanism in operation is so delicate as to entirely absorb the motion of the car caused by irregularities in the road.

In that type of motor car wherein the leaf spring extends parallel with the sides of the car instead of with the axle (shown in Figure 3), 44 designates a portion of the frame, and 45 the leaf springs, which are generally connected with the rear axle 46 by the clamp 47, enclosing the housing 48, and the clamp bolts 49. In such case the clamp sections 25 and 26 secure the loop spring 28, which is connected by the link 50 to the spring 53 by the studs 51 and 52. This spring 53 is secured to the frame 44 by the reinforcing plates 54 and 55 that are all joined by the bolts 56 and 57. A rivet 58 secures the frame 44 to the clamp 55 and the inner end of the spring 53 together as a unit.

My invention is readily adapted to any form of motor vehicle having the characteristics above described, and such modification as may be necessary in some of the parts to adapt them to different makes of motor vehicles are so slight as to be practically negligible.

There are minor changes and alterations that may be made within my invention, aside from those herein suggested, and I would therefore have it understood that I do not limit myself to the exact construction herein shown and described, but claim all that falls fairly within the spirit and scope of the appended claims.

Having described my invention, what I claim as new and desire to secure by Letters Patent, is:

1. In a device of the character described, having a rigid member and a leaf spring adjacent thereto; means for forming a yielding connection therebetween, comprising a second spring superimposed upon the leaf spring between the outer end thereof and its point of contact with securing means; a third spring connected with the rigid member; and a rigid connection between the free ends of each of these latter springs.

2. In a device of the character described, having a rigid member and a leaf spring adjacent thereto; means for forming a yielding flexible connection between the rigid member and leaf spring, comprising a second spring connected with one or more of the leaves of the leaf spring, and having one free end; a third spring connected with the rigid member substantially parallel with the length thereof and a rod connection between the free ends of each of these latter springs.

3. In a device of the character described, having a rigid member and a leaf spring adjacent and substantially parallel thereto; means for forming a yielding connection therebetween, comprising a second spring connected with the leaf spring; a third spring connected with the rigid member substantially parallel with its length; a rigid connection between the free ends of each of these latter springs; means for securing the second spring to the leaf spring, comprising a plurality of clamp sections arranged upon opposite sides of the spring; and means for securing the clamp sections together.

In testimony whereof, I have hereunto affixed my signature.

ALBERT EHLERS.